Oct. 17, 1944.  L. P. JARRELL  2,360,683
COMPOUND TOOL HOLDER FOR PLANERS
Filed Aug. 2, 1943  2 Sheets-Sheet 1
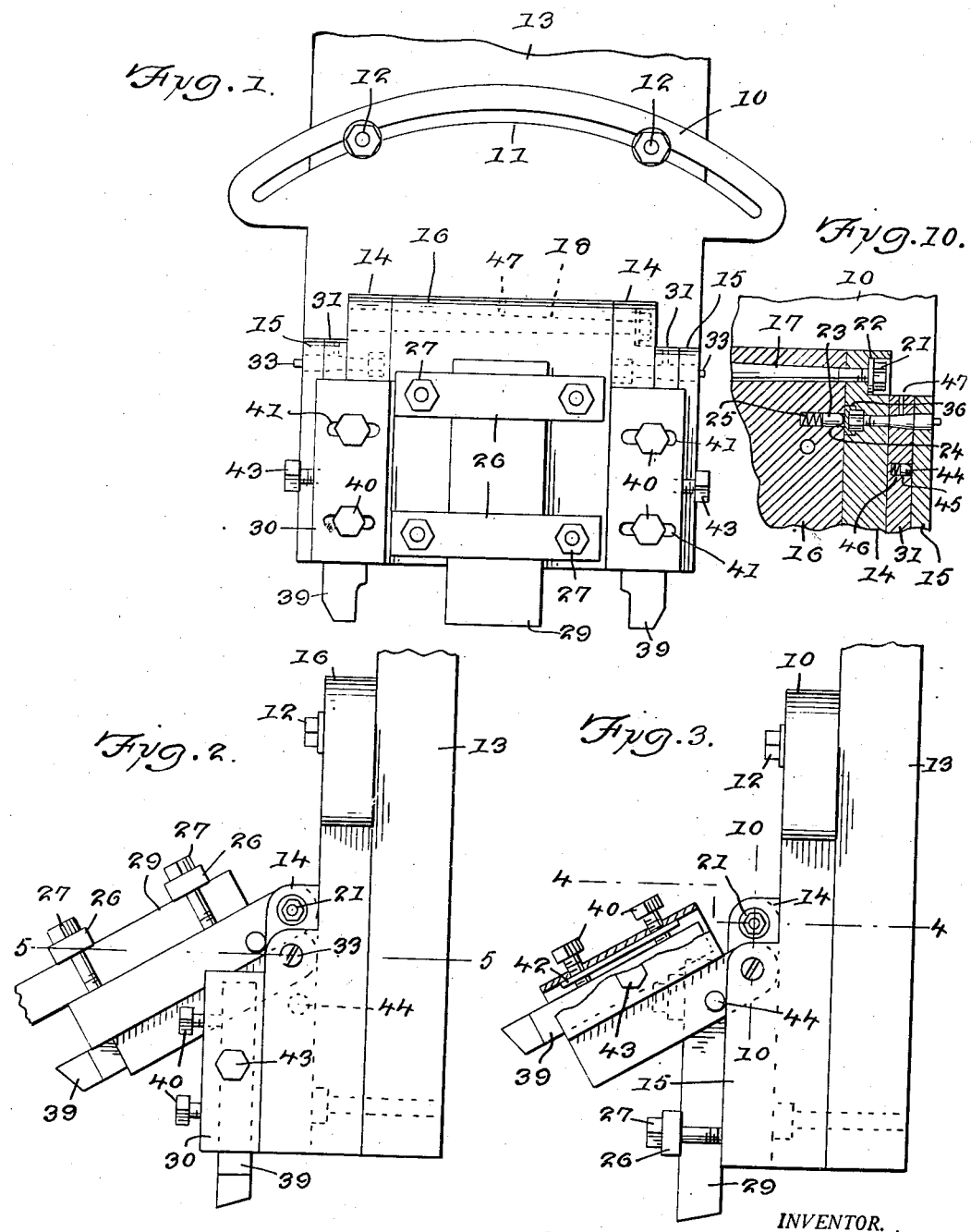
INVENTOR.
Lemuel Pierce Jarrell
BY
Victor J. Evans & Co.
ATTORNEYS Oct. 17, 1944.   L. P. JARRELL   2,360,683
COMPOUND TOOL HOLDER FOR PLANERS
Filed Aug. 2, 1943   2 Sheets-Sheet 2
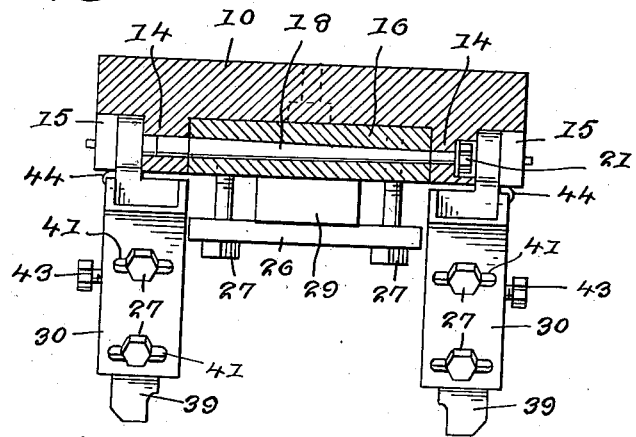
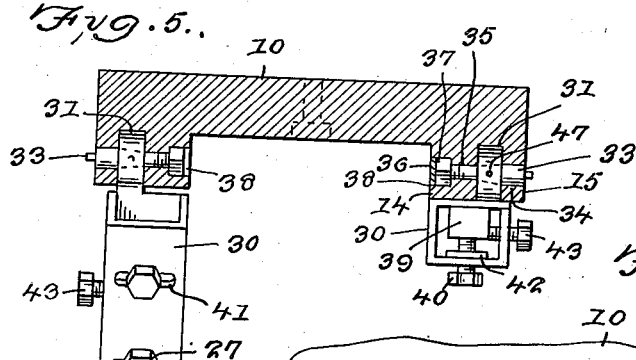
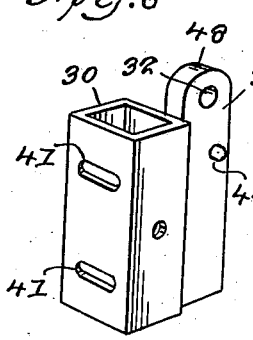
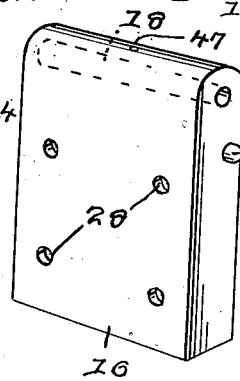
INVENTOR.
Lemuel Pierce Jarrell
BY
Victor J. Evans & Co.
ATTORNEYS Patented Oct. 17, 1944

2,360,683

UNITED STATES PATENT OFFICE 2,360,683

COMPOUND TOOLHOLDER FOR PLANERS

Lemuel Pierce Jarrell, Huntington Park, Calif.

Application August 2, 1943, Serial No. 497,078

3 Claims. (Cl. 90—54)

This invention relates to a compound tool holder for planers and has for an object to provide a device of this character adapted to be of particular effectiveness in working upon railway frogs in which the frog filler has a notch for a side point and the tools must go the entire length of the material, an object of the present invention being to provide extra tool holders located on the tool bar at the lateral sides of the main tool holder, the main and extra tool holders being pivoted at their upper ends so that for example, the main tool may be swung up so that it does not strike the work or the material to permit the use of the extra tools for a special operation or particular kind of work, and when that operation has been finished the main tool may be let down and the extra tool or tools swung out of the way to permit continuation of the work by the main tool, the advantage being that the necessity of taking out the main tool in order to put in a little tool for small operation, is eliminated.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 1 is a front elevation of a compound tool holder for planers constructed in accordance with the invention.

Figure 2 is an end elevation of the tool holder shown in Figure 1 and showing the main tool and one of the small tools raised and releasably locked in released position to permit the use of the other small tool.

Figure 3 is a view similar to Figure 2 but showing the small tool holders in released position and the main tool holder in operative position.

Figure 4 is a cross sectional view taken on the line 4—4 of Figure 3 showing the tapered pin forming the pivot of the main tool holder.

Figure 5 is a cross sectional view taken on the line 5—5 of Figure 2.

Figure 6 is a detail perspective view of one of the small tool holders.

Figure 7 is a detail perspective view of the apron of the large tool holder.

Figure 8 is a detail front elevation of the tool box.

Figure 9 is a cross sectional view taken on the line 9—9 of Figure 8.

Figure 10 is a cross sectional view taken on the line 10—10 of Figure 3 with both the main tool and the small lateral tool in the position shown in Figure 1.

Referring now to the drawings in which like characters of reference designate similar parts in the various views, 10 designates the tool box the same having an arcuate slot 11 through which bolts 12 are passed to secure the box to the tool post 13. The tool box is provided on its front face with a pair of spaced wings 14 and outside of the wings is provided with wings 15, see Figures 8 and 9.

The tool apron 16, see Figure 7, is of sufficient width to fit between the wings 14 and is pivotally connected at the upper end to the wings by a tapered pivot pin 17, see Figure 10, which is passed through a tapered opening 18 in the apron and is engaged in openings 19 in the wings 14, one of the openings 19 being provided with an enlarged extension 20 to receive a securing nut 21 and washer 22 for securing the small end of the tapered pin in position. The apron can swing upwardly to released position on the pivot pin and is yieldably held in this released position by a stop lug 23 which is slideably mounted in an opening 24 in the edge of the apron there being a helical spring 25 in the opening back of the lug to normally urge the lug outwardly so that when the main tool holder is swung upward to released position the stop lug will engage the front edge of the adjacent wing 14 and prevent the main tool holder from accidentally gravitating onto the work, see Figure 2.

The main tool holder also comprises a pair of spaced transversely disposed bars 26, see Figure 1, which are secured at the ends to the apron by screw bolts 27 passed through the end portions of the bars into openings 28 of the apron. The main tool 29 is clamped by the bars against the apron and is of less width than the space between the bolts of a respective bar so that the tool may be angled to perform certain operations.

A small tool holder is mounted on each side of the main tool holder, see Figure 6, and comprises a tubular holder 30 of substantially rectangular cross section having an integral hinged bar 31 extending longitudinally of the rear side and provided at the upper end with a tapered opening 32. The hinge bar 31 is received between one of the wings 14 and the adjacent wing 15, see Figure 5. A tapered pivot pin 33 is passed through openings 34 and 35 in the wing 15 and wing 14 respectively and through the opening 32 of the hinge bar. The pin is threaded at its smaller end to engage in a nut 36 disposed in a recess 37 in the wing 14, the nut being nonrotatably held in place by a substantially U-shaped shield 38.

A small tool 39 is mounted in the holder 30 and the holder is provided with a pair of screw bolts 40 which are engaged through slots 41 in the front wall of the holder, see Figure 1, and clamp the tool to the back wall of holder. The bolts are threadedly engaged through a plate 42 inside the front wall of the holder to prevent escape of the bolts. A third bolt 43 is engaged through the side wall of the holder to coact with the bolts 40 in properly positioning the tool 39 in the holder, see Figure 5. The slots 41 permit lateral adjustment of the tool in the holder.

The small tool holders may be rocked upwardly to released position and held against accidental gravitation through the medium of respective stop lugs 44, see Figure 10, each of which is disposed in a recess 45 in the tool holder hinge bar 31. A spring 46 is disposed in the recess back of the stop lug to urge the stop lug outwardly. When the small tool holder is rocked upwardly to released position the stop lug 44 will releasably engage the front edge of the wing 15, see Figure 3, and prevent accidental gravitation of the tool holder.

The tapered pivot pins may be reinforced against accidentally working loose by small pins 47 engaged through openings 48 in the apron 16 and hinge bars 31 and bearing against the tapered surface of the respective hinge pins.

In operation any of the tool holders may be selectively brought into position to perform an operation on the work while the remaining tool holders are rocked upward and releasably held in released position until needed to perform other operations on the work.

From the above description it is thought that the construction and operation of the invention will be fully understood without further explanation.

What is claimed is:

1. A compound tool holder for planers comprising a tool box, ribs on the tool box, a main tool holder disposed between the innermost ribs, extra tool holders located between ribs at the lateral sides of the main tool holder, means pivotally mounting the main and extra tool holders at their upper ends to respective ribs permitting the tool holders to be selectively swung up to released position or swung down to operative position, and spring pressed lugs carried by the main and extra tool holders adapted to engage the ribs and releasably hold the tool holders in operative or in released position.

2. The structure as of claim 1 and in which pivots of the extra tool holders are tapered pins.

3. The structure as of claim 1 and in which the spring pressed lugs are mounted in the lateral edges of respective tool holders and are adapted to engage the inner sides or the outer sides of the ribs to releasably hold the tool holders in operative or in inoperative positions respectively.

LEMUEL PIERCE JARRELL.